United States Patent [19]

Gasiunas

[11] Patent Number: 4,942,394
[45] Date of Patent: Jul. 17, 1990

[54] HALL EFFECT ENCODER APPARATUS

[75] Inventor: Donatas V. Gasiunas, Carmel, N.Y.

[73] Assignee: Pitney Bowes Inc., Stamford, Conn.

[21] Appl. No.: 135,793

[22] Filed: Dec. 21, 1987

[51] Int. Cl.⁵ .............................................. G08C 19/06
[52] U.S. Cl. ................................. 340/870.31; 101/91; 101/110; 341/15
[58] Field of Search ...................... 340/870.31; 341/15; 324/61 R, 207, 208; 101/91, 110

[56] References Cited

U.S. PATENT DOCUMENTS

| 4,293,837 | 10/1981 | Jaffe et al. | |
| 4,398,458 | 8/1983 | Denzin et al. | 101/91 |
| 4,719,419 | 1/1988 | Dawley | 324/208 |
| 4,728,950 | 3/1988 | Hendrickson et al. | 340/870.31 |
| 4,746,859 | 5/1988 | Malik | 324/208 |
| 4,754,220 | 6/1988 | Shimizu et al. | 324/208 |

FOREIGN PATENT DOCUMENTS 1511018 5/1978 United Kingdom .
2156994 10/1985 United Kingdom .

Primary Examiner—Donald J. Yusko
Assistant Examiner—Tyrone Queen
Attorney, Agent, or Firm—Michael J. DeSha; David E. Pitchenik; Melvin J. Scolnick

[57] ABSTRACT

An encoder for a wheel or other devices with relative movement comprises in the use of a printwheel, a linear Hall-effect sensor and magnet mounted in a non-ferrous metal shaft with a flux conducting spiral ring molded in the printwheel and encircling the shaft. The angular position of the printwheel is absolutely determined by the magnitude of the signal relative to the transition point of the spiral. The values are converted to digital information and stored in non-volatile memory for comparison to the values measured as the wheel is positioned during operation of the wheel. In another embodiment, a second Hall-effect sensor is placed on the shaft opposite the first sensor to provide an enhanced signal.

6 Claims, 8 Drawing Sheets

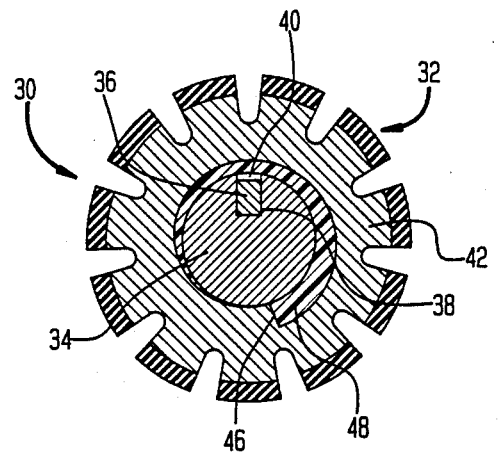
FIG. 3
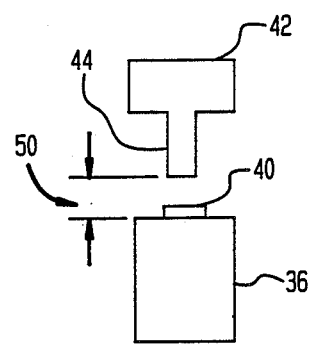
FIG. 4
FIG. 5
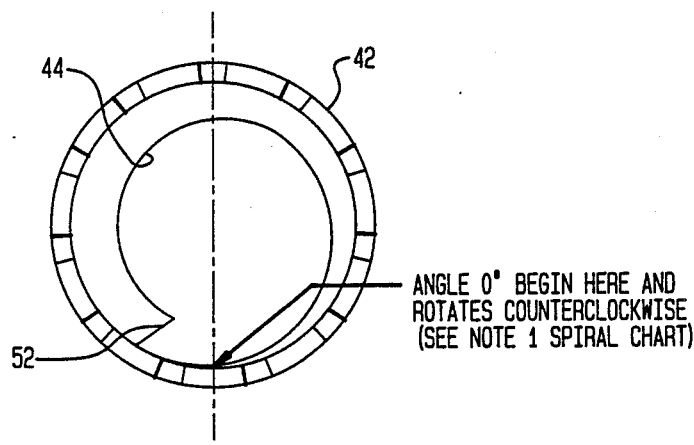
ANGLE 0° BEGIN HERE AND ROTATES COUNTERCLOCKWISE (SEE NOTE 1 SPIRAL CHART)
FIG. 6
| SPIRAL CHART | |
|---|---|
| RADIUS | ANGLE |
| 0.196 | 0.00 |
| 0.187 | 32.73 |
| 0.180 | 65.46 |
| 0.172 | 98.19 |
| 0.166 | 130.92 |
| 0.160 | 163.65 |
| 0.154 | 196.38 |
| 0.149 | 229.11 |
| 0.144 | 261.84 |
| 0.139 | 294.57 |
| 0.135 | 327.30 |

HALL EFFECT ENCODER APPARATUS

BACKGROUND OF THE INVENTION

The invention relates to encoder devices and more particularly to devices for providing signal outputs representing the position of a printwheel.

Printwheel encoders are well-known and are described, for example, in U.S. Pat. No. 3,978,457 and in 4,313,105 in connection with postage meter printwheels. Because of the great need for security in devices such as postage meters which in effect are printing money, many of the known encoder devices which provides mechanical switching contact rising wipers are normally not sufficiently rugged to reach the number of cycles anticipated for the meter. In addition, the environment of postage meters, involving as it does paper dust and envelope glue and water, militates against such mechanical devices because of the expense of the necessary protection against the environmental factors.

In order to avoid this aspect of the environmental problems and to achieve greater life expectancy, optical encoders have been used in various ways in postage meters. While optical encoders work well, there are many cases in which the requirement for encoding necessitates an increased volume of the setting mechanism for the printwheels simply because of the extra space necessary to accommodate the encoder and an encoding disc.

Hall-effect sensors have also been used in postage meters. Magnets have been mounted on the setting rack and the magnetic position is sensed to aid in determining the position of the rack driving a printwheel as shown in U.S. Pat. No. 4,398,458. Magneto-restrictive sensors are shown in U.S. Pat. No. 4,224,603. This last cited patent teaches apparatus which requires that the print drum and its racks be in motion in order to determine the setting of the printwheels.

Hall-effect sensors have also been used to generate position-dependent pulses for synchronization. Such an application is shown in U.S. Pat. No. 3,939,372 in which a flux-conducting cam is brought near the sensor as a shaft rotates in order to generate a signal pulse from the sensor. Also suggested therein is a spiral shaped magnet which in conjunction with the Hall-effect device may be used to provide position information.

In many setting applications and particularly in postage meter printwheel setting mechanisms, there is a need to provide encoding in a small volume and preferably at much less cost than the present optical encoders.

It is therefore an object of the invention to provide an encoder which solves the problem of encoding in a relatively dirty environment and in a small volume.

It is another object to provide an absolute position encoding apparatus particularly for printwheels.

It is yet another object to provide an absolute position encoder for a printwheel which provides security against environmental disturbances.

SUMMARY OF THE INVENTION

In accordance with the present invention, a Hall-effect sensor is mounted on a member and a magnet is also mounted on the member and juxtaposed to the sensor so that flux from the magnet is directed through the sensor to provide a signal output. The magnitude of the output signal corresponds to the strength of the magnetic flux through the sensor. A second member having a flux-concentrating material such as mild steel affixed thereto is arranged for relative movement with respect to the first member and positioned such that a gap is established between the Hall-effect sensor and the flux-concentrating material on the side opposite the magnet. The output of the Hall-effect sensor varies in correspondence with the dimension of the gap so that as the position of the second member changes relative to the first member, the output of the Hall-effect sensor varies in correspondence thereto to provide an indication of the position of the second member relative to the first member.

In a particular embodiment of the encoder, a postage meter printwheel is mounted on a nonferrous shaft having a magnet fixed in a slot in the shaft. The printwheel has a flux-conducting material whose internal configuration forms a spiral about the shaft. A Hall-effect device is mounted on the shaft between the magnet and the flux-conducting material. The Hall-effect device in conjunction with the variable reluctance path provided by the spiral surface of the flux-conducting material as the distance between the magnet and the flux-conducting material varies provides an output signal which varies with the angular position of the printwheel.

The output of the Hall-effect device is fed to an A/D converter whose digital output is then communicated to a microcomputer for providing printwheel-position-determining information to the microcomputer. The output of a plurality of encoders may be multiplexed for communication to the A/D converter if desired.

In a further embodiment, another Hall-effect device is mounted on the shaft on the opposite side from the magnet for the purpose of measuring the return flux. The output from this second Hall-effect sensor may be used to supplement the output from the first Hall-effect device to provide greater accuracy if required for the largest gap widths. A sum of the two values also provides information on the total magnetic field; unacceptable variation in total flux would indicate attempts to tamper.

BRIEF DESCRIPTION OF THE DRAWINGS

FIG. 3 is a cross-section of a printwheel showing an encoding arrangement in accordance with the invention.

FIG. 4 shows a schematic end view of the relationship of the magnet, sensor, and concentrator.

FIG. 5 is a side view of the flux-conducting ring.

FIG. 6 is a table of the radii of the spiral surface vs. angle of the printwheel.

DESCRIPTION OF THE PREFERRED EMBODIMENT

Figure 1:
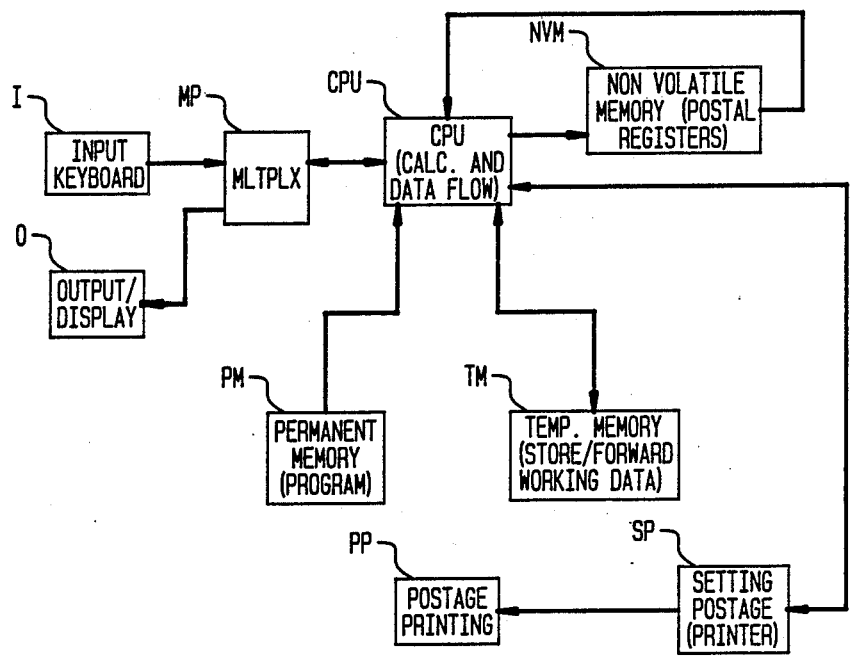
FIG. 1 is a block diagram of an electronic postage meter incorporating an encoder in accordance with the invention.

FIG. 1 is a block diagram of an electronic postage meter incorporating an encoder arrangement in accordance with the invention. Typical postage meter systems in which an encoder in accordance with the invention may be used are disclosed for instance in U.S. Pat. No. 3,978,457 issued to Check, Jr. specifically incorporated herein by reference and U.S. Pat. No. 4,301,507 issued to Soderberg, et al., also specifically incorporated by reference herein.

Referring now to FIG. 1, an electronic postage meter is shown which operates under the control of a central processing unit (CPU). The CPU accepts input data regarding postage to be printed and the like from an input keyboard I or from a peripheral device as described in U.S. Pat. No. 4,301,507 previously incorporated by reference. As seen in FIG. 1, the input data may be received at a multiplexer MP which conveniently serves as well to provide output data to output display device labeled "0".

The CPU performs calculations on the input data and provides control of the meter operation directed by a computer program which reside in permanent memory PM. Accounting data is transferred to non-volatile memory either on a transaction-by-transaction basis as described for instance in U.S. Pat. No. 4,484,307 or may be transferred after calculations performed in temporary memory TM and then transferred to non-volatile memory, again either on a transaction-by-transaction basis or at the end of a particular batch of operations or at the end of a run on power-down as described in U.S. Pat. No. 3,978,457.

In accordance with input data to the CPU and under control of the program, the CPU provides information for the setting of printwheels through a setting mechanism SP to the postage printer shown at PP. The position of each bank of printwheels is monitored by an encoder device to provide data to the CPU to assure that the printwheels are positioned to the expected setting in accordance with the invention provided by the setting mechanism SP, Encoder information is sent to the CPU for comparison to the expected setting.

While the instant invention is shown in conjunction with value printing wheels, it will be understood that encoder the embodiment shown herein may be utilized in conjunction with other printing wheels such as those used for printing dates or identification numbers or the like. It will also be appreciated that the invention illustrated and described in the instant embodiments for angular rotation may be adapted to linear relative movement as well.

Figure 2:
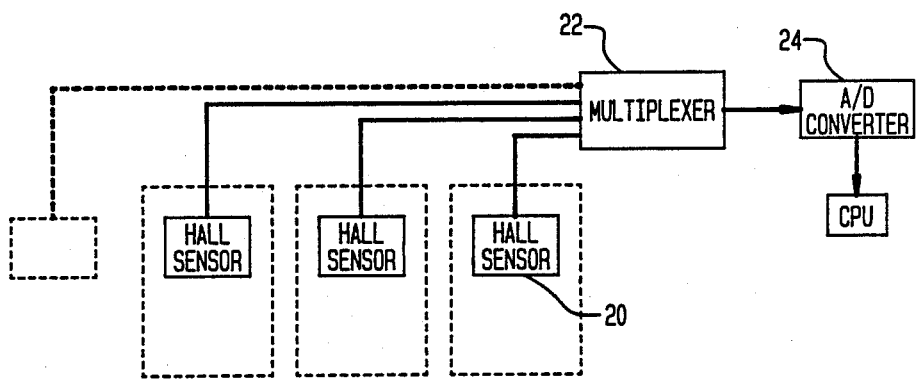
FIG. 2 is a block diagram of the encoder system in accordance with the invention.

FIG. 2 shows a block diagram of the encoding apparatus in accordance with the invention. Linear Hall-effect devices 20 mounted in juxtaposition to printwheels (indicated in broken lines) provide, as described below, respective outputs corresponding to the position of each of the printwheels to a multiplexing device 22 which communicates with A/D converter 24 for output of digital position signals to the CPU representing the actual position of the printwheels in printing device PP of FIG. 1.

A suitable analog multiplexer device is available from National Semiconductor, device No. CD4053. A suitable A-to-D converter for use in accordance with the invention is available from Analog Devices, device No. AD7574.

FIG. 3 shows a cross-section of a printwheel which includes an encoder device in accordance with the invention. The printwheel 30 has a plurality of print elements, one of which is indicated at 32, (suitably of rubber) regularly spaced and bonded to projections about its periphery. In the illustrated embodiment there are 11 elements, but it will be understood that, if desired, there may be fewer or more up to the limit dictated by size of printing elements.

The printwheel 30 is shown rotatably mounted on a shaft 34. The shaft must be fabricated from non-ferrous material which may be chosen from aluminum, brass, plastic or other non-magnetic materials which are well known in the art. Magnet 36 is held in slot 38 of the shaft. Hall-effect linear sensor 40, suitably Hall-effect device No. XL3503, manufactured by Sprague, is shown affixed over slot 38 above the magnet 36. Suitable magnets are available from Indiana General.

Within the periphery of the printwheel 30, as best seen in FIG. 5, is a ring 42 of flux-conducting material, preferably a mild steel. The inner surface of the ring projects inwardly in a spiral configuration or spiral scroll 44 of increasing distance from the periphery of the shaft with a step return to the closest point indicated at 46. It will be appreciated that the projections about the periphery for the printing elements may be molded over the ring shown in FIG. 5 or may be manufactured as part of the ring 42. A molded plastic inner bearing surface 48 completes the printwheel. Printwheels are also illustrated in perspective in the assembly shown in FIG. 13.

FIG. 4 illustrates in schematic form the relationship between the magnet 36, the Hall-effect sensor 40, and the flux-conducting scroll or concentrator 44. It will be understood that the gap dimension, indicated at 50, between the spiral surface of the flux-concentrating material 44 and the Hall-effect sensor 40 depends upon the angular position of the printwheel with respect to the Hall-effect sensor. Since the output of the linear Hall-effect sensor 40 depends on the dimension of the gap between the flux-concentrating material and the sensor, the output from the sensor 40 will correspond to the actual gap width between the flux-concentrating material directly opposite the sensor and the Hall-effect sensor. Thus the actual magnitude of the output relative to the lowest or highest output will be in determinable correspondence to the angular position of the printwheel 30 in respect to the Hall-effect sensor 40.

Figure 13:
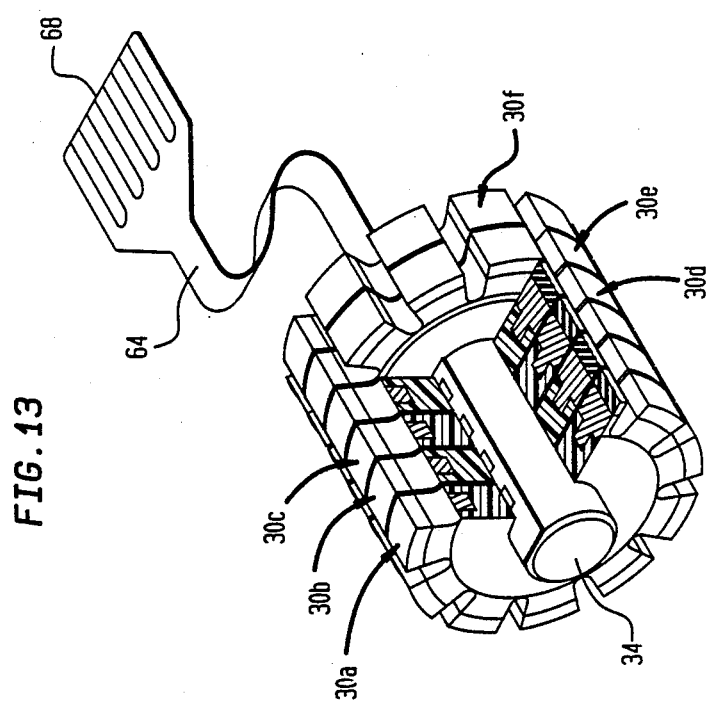
FIG. 13 is a perspective view of a printwheel assembly incorporating an encoding arrangement in accordance with the invention.

As seen in FIG. 4, the cross-section of the spiral scroll is a T-shape. For single wheels, the width of the spiral scroll is less important than for assemblies of closely adjacent wheels where there is the possibility of cross coupling of magnetic flux among the scrolls. However, it will be appreciated that there is a minimum amount of material which is necessary to provide suitable flux concentration. The optimum thickness of the scroll portion has been found to be about .030 inch for a configuration as seen in FIG. 13. It will be understood that as separation between adjacent printwheels increases, the thickness of the scroll portion can increase.

FIG. 5 shows the preferred configuration for the scroll surface 44. While a circular spiral or other changing surfaces may be used, it is preferable that the surface is configured as a hyperbolic spiral to linearize the output of the Hall-effect sensor. For best results, the step between high and low points is undercut as shown at 52 to provide a sharp transition between the lowest and highest outputs from the Hall-effect sensor. FIG. 6 is a table showing the radius to the spiral surface at each step angle of the printwheel.

Figure 7:
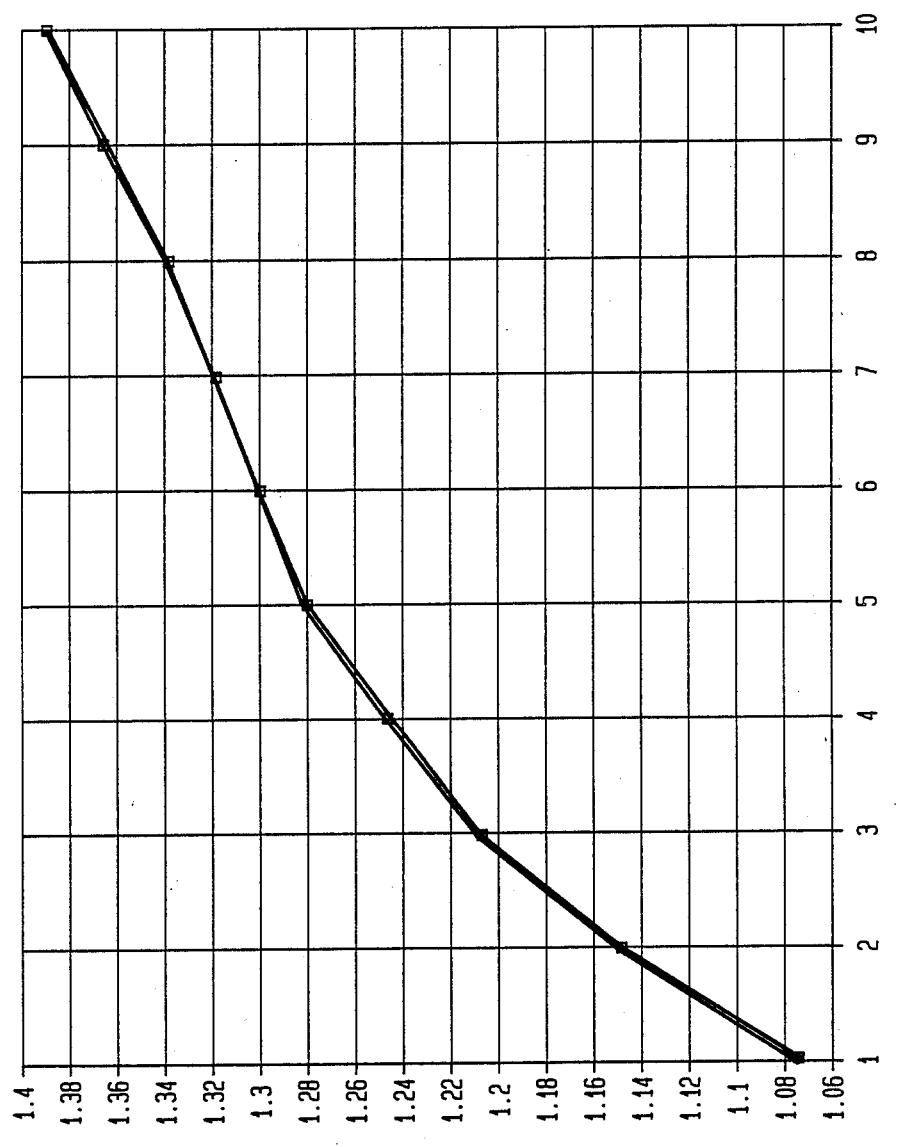
FIG. 7 is a graph of a typical output voltage-position of Hall-effect encoder apparatus of construction similar to the printwheel illustrated in FIG. 3.

FIG. 7 is a graph of output of voltage with respect to position measured in a test fixture. The necessary resolution in the A/D converter for determining the actual position of the wheel depends only upon the accuracy required. For the case of printwheels which have determined discrete angular position settings, there is only the requirement that the printwheel be within a certain range of output values and the required resolution for absolute encoding is relatively low.

It will also be noted that the step between the highest to the lowest output as the wheel turns provides a clear indication of the "home" position. All values may be then measured with respect to the output at this transition point in order to determine the range output at each printwheel setting.

Figure 8:
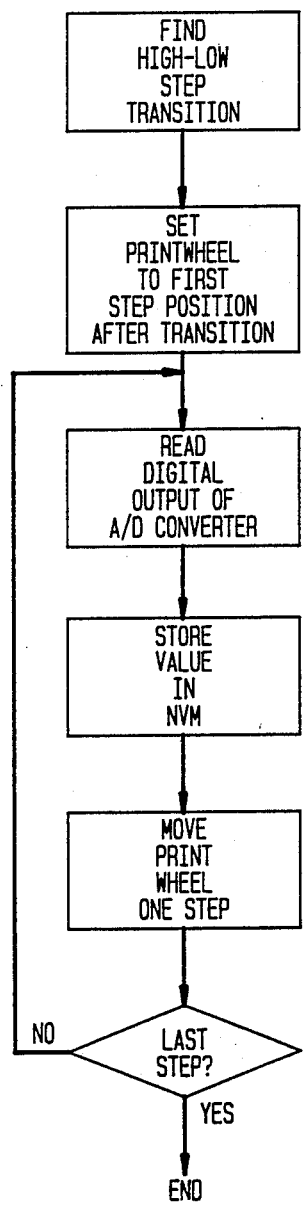
FIG. 8 is a flow chart illustrating the determination of values for absolute encoding of the printwheel.

FIG. 8 shows a routine for inserting into non-volatile memory measured values of the output of the A-D converter corresponding to the position steps of the printwheel. The transition from high to low is noted and the first position thereafter is measured as the output of position 1. The output is read and the value is stored in non-volatile memory. The printwheel is moved one step and the new value read and stored until all values have been read and stored.

It will be appreciated that the measurements thus made and stored eliminate any need for precision tolerances in the construction of the printwheel and encoder. The wheel structure is fabricated and mounted on the shaft, the initial measurements are made and the value stored, and thereafter for the output of the Hall-effect sensor is compared with the stored value determining the absolute position of the printwheel.

Figure 9:
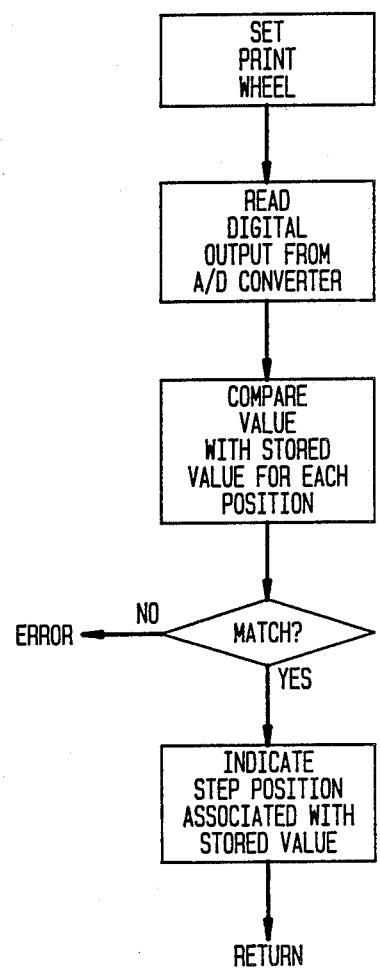
FIG. 9 is a flow chart of the routine for using the encoder values in setting of postage printwheels.

FIG. 9 shows a routine for operation of the encoder, for example, in the setting of printwheels for postal value. Under command of the CPU, the printwheels are moved to a new desired position. The output of the A-to-D converter corresponding to the analog output signal from the printwheel Hall-effect sensor is read and compared to the known values stored in the non-volatile memory. If there is no match an error is signalled. If there is a match, the particular position is indicated and the CPU returns to operate on the next printwheel or to the main program.

Of continuing concern in analog devices is variation in analog output over time or with changes in configuration. In the instant embodiment, it will be appreciated that the measurement of output signal of the Hall-effect device versus angular position of the printwheel which is measured initially to establish the range of output at each setting and is stored in the non-volatile memory is always available for comparison at predetermined times or as desired during service checks to determine if correction is necessary.

The output of the Hall-effect device may be communicated directly to the A to D converter if only a single output is required, but preferably, where multiple printwheels are to be encoded the output is multiplexed from any additional sensors through the multiplexing device 22 as shown in FIG. 2 so that the output of each Hall-effect sensor for each printwheel is fed to the A-to-D converter for providing digital position information on each printwheel to the CPU.

It will be appreciated that in providing the encoder mechanism in accordance with the invention, the spiral scroll surface is not limited to being placed as indicated, i.e., the inside surface of the ring in the printwheel. The Hall-effect device and magnet could be placed outside the boundaries of the printwheel so that the magnet is on the outside and the scroll is the outer periphery of the ring placed about the shaft in juxtaposition to the magnet. It will also be appreciated that the magnet and Hall-effect sensor could be placed perpendicularly to the printwheel and the flux-conducting material be arranged such that the spiral surface and therefore the gap dimension is increasing parallel to the axis rather than perpendicular to the axis as in the embodiment shown.

It should be further noted, however, that the embodiment illustrated is the most compact arrangement of those described. It also has the further advantage that any stray magnetic fields are effectively blocked by the mild steel scroll material so as to prevent any external environmental stray magnetic fields from affecting the printwheel setting indicator or to thwart any attempts to breach the security of the meter by preventing reading of proper values at the Hall-effect sensor.

It will also be appreciated that the invention is not limited to the circular arrangement shown and that any two members having relative displacements may be encoded by arrangement of the flux concentrating material such that displacement of the members increases and decreases the gap between the flux concentrator and the Hall-effect sensor.

Figure 10:
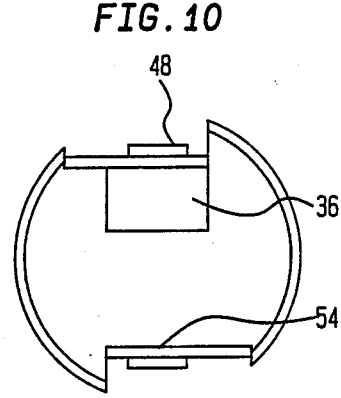
FIG. 10 shows another embodiment of a printwheel and shaft using an additional Hall-effect sensor for compensation.

FIG. 10 is another embodiment of a printwheel encoder in accordance with the invention. In this embodiment, another Hall-effect device 54 is fixed on the periphery of shaft 34 opposite Hall-effect device 40 to measure the return flux to the magnet 36.

The output signal available from this Hall sensor 54 will vary in respect of distance between it and the scroll in the same manner as the varying output of device 40. The step changes in flux tend to decrease as the gap between scroll 44 and the Hall-effect sensor 40 widens. The change in flux at Hall-effect device 54 will, also provide measureable changes in the return flux which may be used to increase the signal available from the sensor 40. This additional signal when compared with stored values may be used to assure accuracy of reading.

It will be appreciated that the total flux through the two sensors will normally remain constant. Thus, if for some reason, the value of the sum of the outputs from the two signals were to change from a previously determined sum, there is an indication of tampering.

Figure 11:
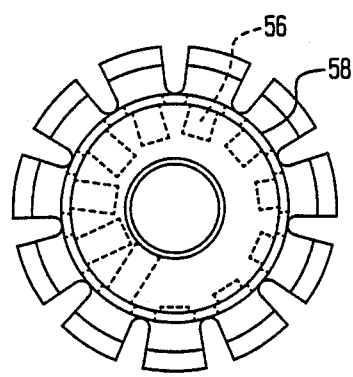
FIG. 11 shows an alternate embodiment of a printwheel encoder arrangement.

FIG. 11 shows an alternative embodiment of the printwheel. The construction of the printwheel is the same as previously described except that in place of the continuous spiral shown in FIG. 3, a plurality of mild steel teeth respectively located at each printwheel step, one of which is indicated at 56, and each being of depth preferably corresponding to the spiral surface shown in FIG. 3, project inwardly from ring 58. It will be understood that as the slots are positioned over the Hall-effect sensor 40, the output of the sensor 40 drops. The slots between the teeth 56 thus serve to assure that the printwheel has reached the exact position step when it reaches the maximum value for the particular position step since the output between adjacent teeth falls to a minimum.

Figure 12:
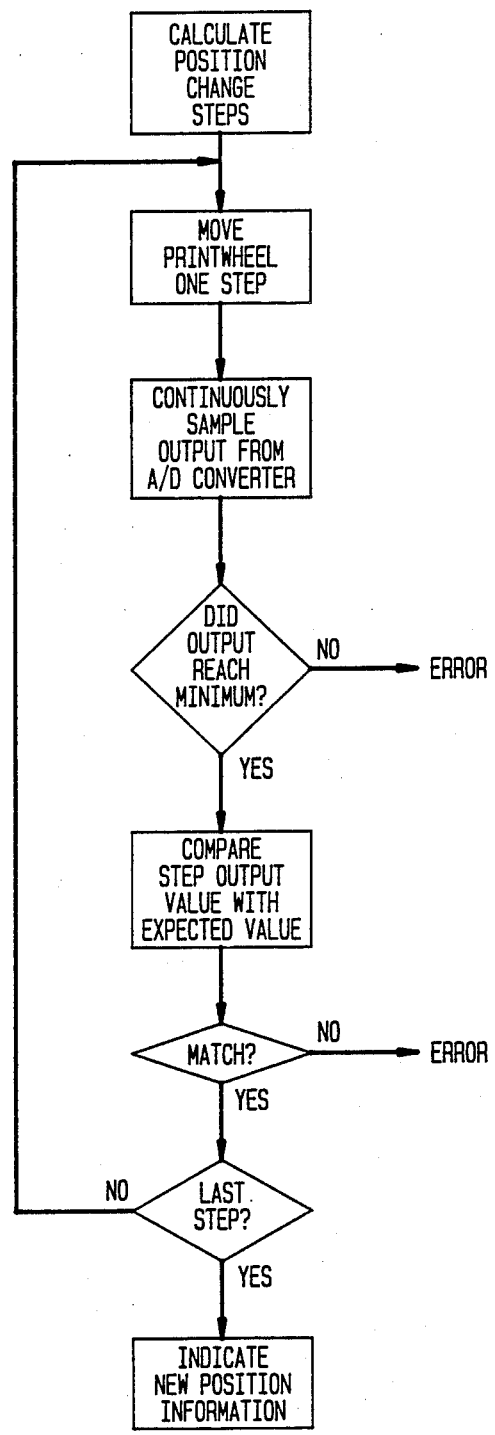
FIG. 12 is a flow chart illustrating a routine for encoding utilizing the embodiment of FIG. 11.

Further with continuous monitoring of the output of Hall-effect device, redundant position information may be obtained by counting the number of slots passed during the movement of the wheel from the initial position to the new position. FIG. 12 is a routine for utilizing the encoding of the printwheel of FIG. 11.

Figure 14:
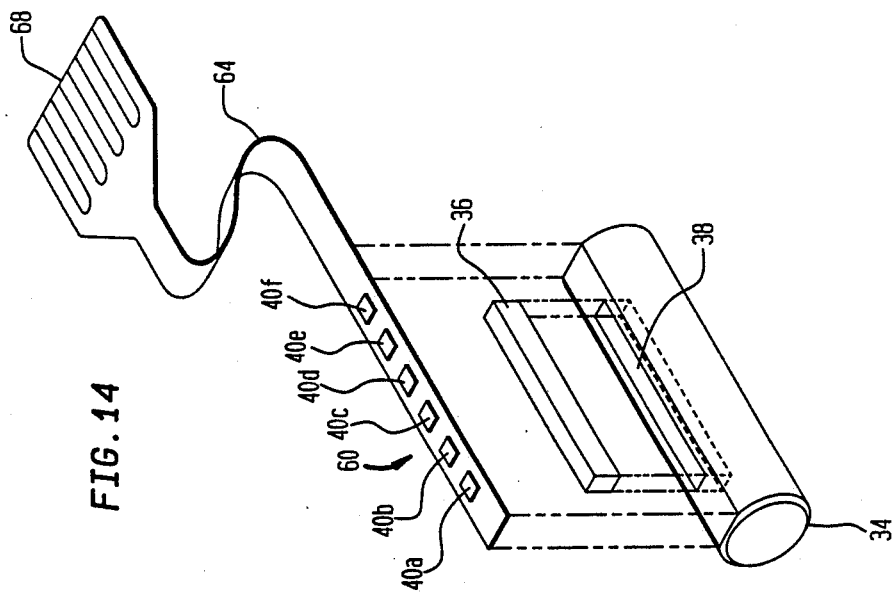
FIG. 14 is an exploded perspective view further illustrating the printwheel shaft and Hall-effect devices shown in FIG. 12.

Turning now to FIGS. 13 and 14, there is shown a perspective view of a printwheel assemblY incorporating an encoding arrangement in accordance with the invention. Shaft 34, which may be made of injection molded plastic or machined from aluminum or brass as previously discussed in connection with FIG. 3 has a longitudinally extending slot 38 into which is inserted and fastened permanent magnet strip 36.

Figure 16:
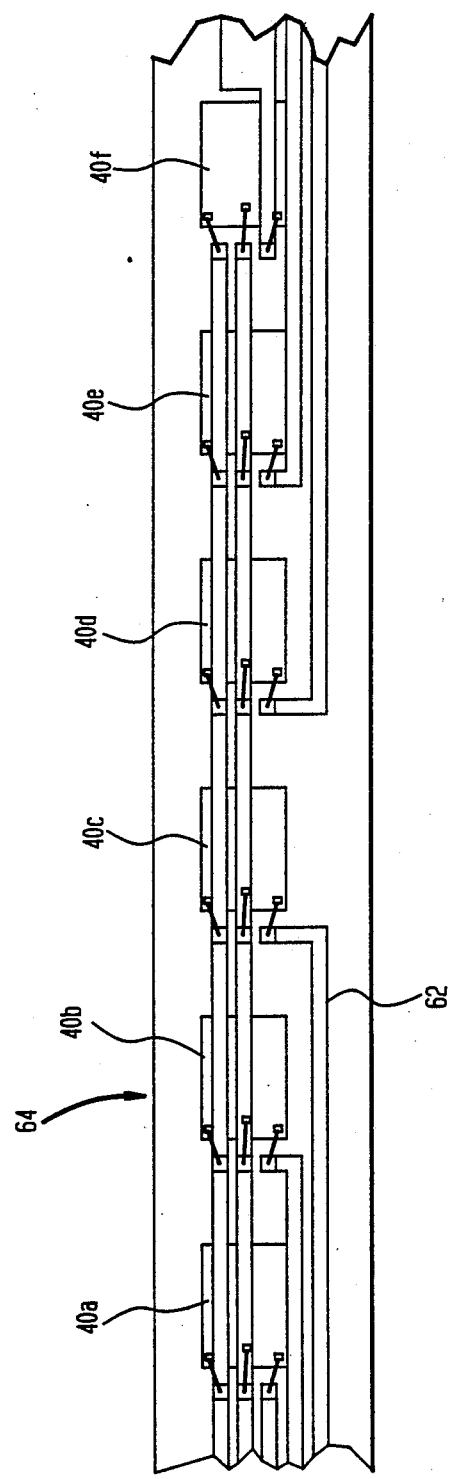
FIG. 16 is a top view of the flexible PC board for mounting the Hall-effect sensors in the flexible sensor assembly.

Flexible Hall-effect sensor assembly 60 includes spaced linear Hall-effect sensors 40a through 40f such as the aforementioned device manufactured by Sprague, bonded by gold-welding to leads (62) on a so-called flexible print circuit board 64 shown in FIG. 16 which terminates preferably in ribbon connector 68. For best results, the shaft is encapsulated to protect and secure the Hall-effect sensors and to provide a continuous bearing surface for the assembled printwheels. It will be appreciated that where injection molded plastics are used, the sensor assembly 60 and magnet 36 may be simply embedded in the injection molded plastic forming the shaft. In the case of a machined or previously molded shaft, the entire unit can be encapsulated using conventional epoxy-type encapsulants.

Individual printwheels of the type described in conjunction with FIGS. 3, 5, 10, or 11 are molded to include a bearing surface for rotation about the shaft. The individual printwheels 30a, 30b, 30c, 30d, 30f, are mounted for rotation on the shaft. Preferably, the wheels are simply mounted adjacent each other and held in place in juxtaposition to the corresponding Hall-effect sensors suitably by a flange, for example, at one end (not shown) and a clip retainer (not shown) at the other.

The individual printwheels may be driven by a picker mechanism as described for example in Application Serial No. 136,084, filed on Dec. 21, 1987, now U.S. Pat. No. 4,875,788 entitled POSTAGE PRINTWHEEL SELECTOR APPARATUS. Other suitable mechanisms for driving the printwheels include the use of gears affixed to the printwheels for driving by racks or gear trains will occur to those skilled in the art and will not be further described.

It will also be understood that each printwheel may be mounted individually for rotation about its own corresponding shaft and that the Hall-effect sensor may be individually mounted if desired.

Figure 15:
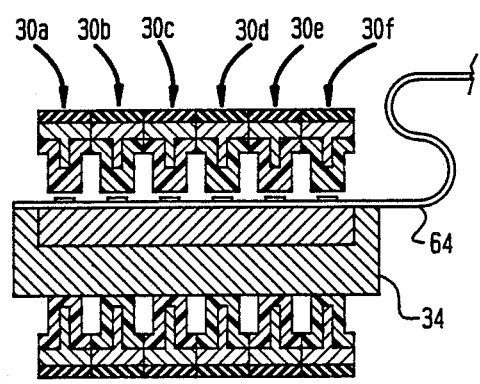
FIG. 15 is a cross-section of the printwheel assembly viewed from the side.

FIG. 15 is a cross-section of the printwheel assembly viewed from the side. It will be noted in this view that rings 42a through 42f when spaced this closely provide a nearly continuous flux-conducting sheath around the shaft. The advantage of this arrangement is that the Hall-effect devices on the shaft are protected from extraneous magnetic fields which are absorbed by sheath and therefore can not contribute to the flux through the sensor.

This application incorporates certain material common to other applications identified as follows:

Ser. No. 136,085, filed on Dec. 21, 1987, entitled HALL EFFECT PRINTWHEEL ENCODER and Ser. No. 136,076, filed on Dec. 21, 1987 entitled PRINTWHEEL AND ENCODER ASSEMBLY.

What is claimed is:

1. A printwheel encoder comprising:
   (a) a Hall-effect sensor fixed to a shaft;
   (b) magnetic means mounted in the shaft adjacent said Hall-effect sensor;
   (c) a printwheel rotatably mounted in the shaft for rotation with respect to the sensor said printwheel having printing elements thereon;
   (d) a flux-conducting ring disposed in the printwheel and encircling the shaft, said ring having an inner surface formed as a spiral surface which provides a gap between the ring and Hall-effect sensor that varies with the angular position of the printwheel, said Hall-effect sensor providing an output signal whose magnitude depends upon the position of the printwheel;
   (e) means for receiving said output signal and for providing digital information corresponding to an output signal of the Hall-effect sensor at each printwheel setting; and
   (f) means for storing the magnitude of the output signal associated with each printwheel setting for comparison and later determination of a particular printwheel setting in accordance with the comparison with previously stored values.

2. The apparatus of claim 1 wherein the spiral surface is a hyperbolic spiral surface.

3. The apparatus of claim 1 wherein the spiral surface has a step transition from the highest to the lowest point and the step transition at the spiral surface is an undercut step.

4. The apparatus of claim 1 wherein the cross section of the ring is T-shaped.

5. A method for absolutely encoding the angular position of a wheel comprising the steps of:
   (a) mounting a Hall-effect sensor on a shaft in juxtaposition to a magnetic means disposed on the shaft, said Hall-effect sensor providing an output signal;
   (b) providing a flux-conducting ring on a wheel for rotation with said wheel; said flux-conducting ring having a spiral surface extending toward the sensor which forms a varying gap whose dimension depends upon the angular position of the wheel;
   (c) measuring and storing a value of the output signal at a plurality of predetermined angular positions of the wheel;
   (d) setting the wheel thereafter to one of said plurality of predetermined angular positions;
   (e) measuring the output signal of said sensor at said one of the predetermined angular positions;
   (f) comparing the value of the output signal from said sensor to the previously stored values for determining the particular one of said predetermined angular positions to which the wheel is set.

6. Apparatus for encoding the position of a wheel comprising:
   (a) a first Hall-effect sensor fixed to a shaft and providing an output signal whose magnitude is dependent on the magnetic flux thereat;

(b) magnetic means fixed to the shaft adjacent said Hall-effect sensor;
(c) a second Hall-effect sensor fixed on said shaft diametrically opposite said first Hall-effect sensor, said second Hall-effect sensor providing a second output signal whose magnitude is dependent on the magnetic flux thereat;
(d) a wheel rotatably mounted on said shaft for rotation with respect to the sensors;
(e) a flux-conducting ring disposed on the wheel and encircling the shaft, said ring having a surface of varying extension to provide thereby a gap between the flux-conducting ring and the respective Hall-effect sensors that varies with the angular position of the wheel; and
(f) means for receiving and determining the magnitude of output signals from each said Hall-effect sensor, said Hall-effect sensors respectively providing an output signal in correspondence with the dimension of the gap whereby a determined output from each sensor is associated with the angular positions of the wheel.

* * * * *